(12) United States Patent
Kim et al.

(10) Patent No.: US 10,252,953 B2
(45) Date of Patent: Apr. 9, 2019

(54) NANOENERGETIC MATERIAL COMPOSITE HAVING REMOTE IGNITION CHARACTERISTIC

(71) Applicant: PUSAN NATIONAL UNIVERSITY INDUSTRY-UNIVERSITY COOPERATION FOUNDATION, Busan (KR)

(72) Inventors: Soo Hyung Kim, Busan (KR); Ji Hoon Kim, Busan (KR)

(73) Assignee: Pusan National University Industry—University Cooperation Foundation, Busan (KR)

( * ) Notice: Subject to any disclaimer, the term of this patent is extended or adjusted under 35 U.S.C. 154(b) by 331 days.

(21) Appl. No.: 15/360,377

(22) Filed: Nov. 23, 2016

(65) Prior Publication Data

US 2017/0073282 A1    Mar. 16, 2017

Related U.S. Application Data

(63) Continuation of application No. PCT/KR2015/003113, filed on Mar. 30, 2015.

(30) Foreign Application Priority Data

Apr. 7, 2014 (KR) .................. 10-2014-0041492

(51) Int. Cl.
| | | |
|---|---|---|
| *C06B 33/00* | (2006.01) | |
| *B82B 3/00* | (2006.01) | |
| *C06B 43/00* | (2006.01) | |
| *C06B 21/00* | (2006.01) | |
| *C06B 45/32* | (2006.01) | |
| *C06B 23/00* | (2006.01) | |
| *C06B 45/34* | (2006.01) | |

(52) U.S. Cl.
CPC .............. *C06B 33/00* (2013.01); *B82B 3/00* (2013.01); *C06B 21/0008* (2013.01); *C06B 21/0083* (2013.01); *C06B 23/001* (2013.01); *C06B 43/00* (2013.01); *C06B 45/32* (2013.01); *C06B 45/34* (2013.01)

(58) Field of Classification Search
CPC . C06B 33/00; C06B 21/0008; C06B 21/0083; B82B 3/00
USPC ............................................................ 149/7
See application file for complete search history.

(56) References Cited

U.S. PATENT DOCUMENTS

| | | |
|---|---|---|
| 2004/0040637 A1 | 3/2004 | Desilets et al. |
| 2007/0039671 A1 | 2/2007 | Desilets et al. |
| 2008/0066835 A1 | 3/2008 | Desilets et al. |

FOREIGN PATENT DOCUMENTS

| | | |
|---|---|---|
| KR | 10-2006-0006870 A | 10/2006 |
| KR | 10-1174135 B1 | 8/2012 |

OTHER PUBLICATIONS

Keerti Kappagantula et al., "Experimentally measured thermal transport properties of aluminum-polytetrafluoroethylene nanocomposites with graphene and carbon nanotube additives", International Journal of Heat and Mass Transfer, 2012, pp. 817-824, No. 55.

*Primary Examiner* — Edward M Johnson
(74) *Attorney, Agent, or Firm* — Rabin & Berdo, P.C.

(57) ABSTRACT

A nanoenergetic material composite having a remote ignition characteristic by a high-power pulsed laser beam is prepared by adding various contents of multiwalled carbon nanotubes (MWCNTs) to a nanoenergetic composite material (nEM) to enable remote ignition by a high-power laser beam. The nanoenergetic material composite is a MWCNT/nEM composite powder prepared by adding multiwalled carbon nanotubes to the nanoenergetic material, which is a mixture of fuel material nanoparticles and metal oxidizer nanoparticles, wherein the multiwalled carbon nanotubes enhance a combustion rate of the MWCNT/nEM composite powder by delivering thermal energy upon remote optical ignition by the high-power pulsed laser beam.

13 Claims, 7 Drawing Sheets

| | 0 μs | 33 μs | 66 μs | 100 μs | 133 μs | 166 μs |
|---|---|---|---|---|---|---|
| MWCNT (0wt%)-nEM composite | MWCNT-nEM Composite Powder ↓ | | | | | |
| MWCNT (1wt%)-nEM composite | | | | | | |
| MWCNT (2wt%)-nEM composite | | | | | | |
| MWCNT (5wt%)-nEM composite | | | | | | |
| MWCNT (10wt%)-nEM composite | | | | | | |

NANOENERGETIC MATERIAL COMPOSITE HAVING REMOTE IGNITION CHARACTERISTIC

CROSS-REFERENCE TO RELATED APPLICATION(S)

This application is a continuation of International Application PCT/KR2015/003113 filed on Mar. 30, 2015, and claims priority to Korean Patent Application No. 10-2014-0041492, filed on Apr. 7, 2014, the contents of which are entirely incorporated herein by reference for all purposes.

TECHNICAL FIELD

The present invention relates to a nanoenergetic material composite, and more particularly to a nanoenergetic material composite having a remote ignition characteristic by a high-power pulsed laser beam, the nanoenergetic material composite prepared by adding various contents of multi-walled carbon nanotubes (MWCNTs) to a nanoenergetic composite material to enable remote ignition by a high-power laser beam; and a method of preparing the nanoenergetic material composite.

BACKGROUND ART

In addition to recent high oil prices and the need to develop alternative energy sources arising therefrom, global warming, which has been recognized as the biggest problem to the future of the Earth, and the like have called attention to the seriousness of energy problems, and accordingly, the roles of scientists on solving the problems have become important.

Fundamentally, various alternative and renewable energy sources that make use of solar energy, wind energy, geothermal energy, tidal energy, or the like are limited in that they either fail to produce a consistent amount of energy at all times or cannot provide energy at a desired time and place.

Therefore, the research for energy storage and transport, as well as the development of a novel energetic material, is increasingly important.

Nanoenergetic materials (nEMs) are composite materials consisting of a nanoscale fuel and a nanoscale oxidizer, and have a characteristic of releasing inherent chemical energy as thermal energy and explosion pressure in a very short time upon ignition.

Conventional means of igniting a nanoenergetic material include a mechanical impact, flame, electric spark, and the like.

Although such conventional methods of causing ignition mechanically, thermally, or electrically are highly effective for igniting a nanoenergetic material, those methods are much influenced by the external environment such as temperature and pressure, and always require the energetic material to be in direct contact with an external energy source for ignition. Therefore, use of such conventional methods in various thermal engineering systems is greatly limited.

In contrast, optical methods of igniting energetic materials can be applied in a variety of thermal engineering systems very effectively, and thus have advantages over the conventional methods of causing ignition mechanically, thermally, or electrically.

That is, when light irradiation is used for igniting an energetic material, direct contact between the energetic material and a light source is not necessary, and thus remote ignition from a long distance is made possible.

In addition, light sources for ignition have an advantage of being relatively less sensitive to environmental factors such as the temperature, pressure, humidity, etc. of the surroundings. The optical ignition of an energetic material requires a sufficient amount of light energy. Therefore, by developing a method that makes a relatively easy optical ignition of nanoenergetic materials possible while minimizing the required light energy, the scope of thermal engineering application of nanoenergetic materials can be maximized.

DETAILED DESCRIPTION OF THE INVENTION

Technical Problem

The present invention is devised to solve the problems of the aforementioned conventional art in regards to energetic materials and ignition methods thereof, and is directed to providing a nanoenergetic material composite having a remote ignition characteristic by a high-power pulsed laser beam, the nanoenergetic material composite prepared by adding various contents of multiwalled carbon nanotubes (MWCNTs) to a nanoenergetic composite material for remote ignition by the high-power laser beam; and a method of preparing the nanoenergetic material composite.

The present invention is directed to providing a nanoenergetic material composite that has a remote ignition characteristic by a high-power pulsed laser beam and offers a novel, optical way of remote ignition based on a high-power Nd:YAG laser; and a method of preparing the nanoenergetic material composite, for the remote ignition of a nanoenergetic material and use of the remote ignition for explosion in air or under water.

The present invention is directed to providing a nanoenergetic material composite having a remote ignition characteristic by a high-power pulsed laser beam, the nanoenergetic material composite containing multiwalled carbon nanotubes with an average diameter of approximately 20 nm as thermal energy delivery media within a nanoenergetic material to enable controlling macroscopic explosiveness upon the ignition of the nanoenergetic material by the laser beam; and a method of preparing the nanoenergetic material composite.

The present invention is directed to providing a nanoenergetic material composite having a remote ignition characteristic by a high-power pulsed laser beam, the nanoenergetic material composite including a nitrocellulose (NC) thin film formed on an exterior of disk-shaped MWCNT/nEM composite pellets to prevent the MWCNT/nEM composite powder from dispersing under water and help reactive components remain bound to one another in a highly dense manner; and a method of preparing the nanoenergetic material composite.

The present invention is directed to providing a nanoenergetic material composite having a remote ignition characteristic by a high-power pulsed laser beam, wherein the nanoenergetic material composite is a MWCNT/nEM composite material that is configured to contain multiwalled carbon nanotubes at 1 wt % to 2 wt % to induce effective thermal energy delivery upon ignition, resulting in an increase in a combustion rate of the MWCNT/nEM composite powder; and a method of preparing the nanoenergetic material composite.

The present invention is directed to providing a nanoenergetic material composite having a remote ignition characteristic by a high-power pulsed laser beam, the nanoenergetic material composite that enables the formation of a system in which remote laser ignition is made possible by using an automatically actuated mirror and a traceable, small-sized sensor upon the ignition of nanoenergetic material pellets in air or under water; and a method of preparing the nanoenergetic material composite.

The objectives of the present invention are not limited to those mentioned above, and other objectives that have not been mentioned may be clearly understood by those skilled in the art from the description provided below.

Technical Solution

In order to achieve one of the objectives, a nanoenergetic material composite having a remote ignition characteristic by a high-power pulsed laser beam according to the present invention takes a form of a multiwalled carbon nanotube (MWCNT)/nanoenergetic material (nEM) composite powder that is prepared by adding multiwalled carbon nanotubes to the nanoenergetic material, which is a mixture of fuel material nanoparticles and metal oxidizer nanoparticles, wherein the multiwalled carbon nanotubes enhance a combustion rate of the MWCNT/nEM composite powder by delivering thermal energy upon remote optical ignition by the high-power pulsed laser beam.

To achieve another objective, a nanoenergetic material composite having a remote ignition characteristic by a high-power pulsed laser beam according to the present invention takes a form of thin film type pellets that are prepared by compressing a MWCNT/nEM composite powder and have a NC thin film for waterproofing formed on a surface thereof, wherein the MWCNT/nEM composite powder is prepared by adding multiwalled carbon nanotubes to the nanoenergetic material, which is a mixture of fuel material nanoparticles and metal oxidizer nanoparticles, wherein the multiwalled carbon nanotubes enhance a combustion rate of the MWCNT/nEM composite powder by delivering thermal energy upon remote optical ignition by the high-power pulsed laser beam.

In this case, the MWCNT/nEM composite contains the multiwalled carbon nanotubes at 1 wt % to 2 wt %.

In addition, aluminum (Al) nanoparticles are used as the fuel material nanoparticles and copper oxide (CuO) nanoparticles are used as the oxidizer material nanoparticles, and the fuel material nanoparticles and oxidizer material nanoparticles are mixed together to form the nanoenergetic composite material.

Also, a ratio at which the fuel material nanoparticles and metal oxidizer nanoparticles are mixed and a percentage of the multiwalled carbon nanotubes to be added are determined based on a pressurization rate, combustion rate, ignition delay time, and total burn time.

Furthermore, the MWCNT/nEM composite is ignited, combusted, and explodes in air or under water when a pulsed Nd:YAG laser beam is remotely emitted, as the multiwalled carbon nanotubes act as thermal energy delivery media within the nanoenergetic material.

Also, the MWCNT/nEM composite includes a traceable, small-sized sensor therein so that a point at which the MWCNT/nEM composite is detected can be irradiated with the laser beam.

In addition, after locating the MWCNT/nEM composite, an angle of incidence of the remotely emitted laser beam is controlled through controlling angles of mirrors installed in a path of the high-power pulsed laser beam so that the laser beam strikes the MWCNT/nEM composite.

To achieve still another objective, a method of preparing a nanoenergetic material composite having a remote ignition characteristic by a high-power pulsed laser beam according to the present invention includes a process of preparing a nanoenergetic material by mixing fuel material nanoparticles and metal oxidizer nanoparticles; and a process of preparing a MWCNT/nEM composite powder by adding multiwalled carbon nanotubes to the nanoenergetic material and then performing mixing using ultrasonic energy.

In this case, Al nanoparticles and CuO nanoparticles are mixed at a 3:7 mass ratio during the process of preparing a nanoenergetic material.

Also, when adding the multiwalled carbon nanotubes to the nanoenergetic material, the multiwalled carbon nanotubes are added in a ratio of 1 wt % to 2 wt %.

In addition, the process of preparing a MWCNT/nEM composite powder includes mixing a MWCNT/Al/CuO powder for 30 minutes in an ethanol solution using ultrasonic energy; and heating the mixture in a convection oven to remove the ethanol solution by drying the same, in order to prepare the MWCNT/nEM composite powder.

Furthermore, the process of preparing a MWCNT/nEM composite powder further includes a process of preparing disk-shaped, thin film type pellets based on a MWCNT/nEM composite by putting the MWCNT/nEM composite powder in a disk-type mold and compressing the same using a mount press; and a process of forming a NC thin film on a surface of the thin film type pellets based on a MWCNT/nEM composite by immersing the pellets in a collodion solution and subsequently drying the same, in order to prevent moisture from penetrating the surface of the thin film type pellets based on a MWCNT/nEM composite.

Advantageous Effects of the Invention

Such a nanoenergetic material composite having a remote ignition characteristic by a high-power pulsed laser beam according to the present invention and the method of preparing such a nanoenergetic material composite have the following effects:

First, various contents of multiwalled carbon nanotubes (MWCNTs) are added to the nanoenergetic composite material to enable remote ignition by a high-power laser beam.

Second, the novel remote optical ignition method based on a high-power Nd:YAG laser enables the remote ignition of a nanoenergetic material and use of the remote ignition for explosion in air or under water.

Third, the multiwalled carbon nanotubes as thermal energy delivery media within a nanoenergetic material are used to enable the control of macroscopic explosiveness upon the ignition of the nanoenergetic material by a laser beam.

Fourth, a nitrocellulose (NC) thin film formed on an exterior of disk-shaped MWCNT/nEM composite pellets can prevent the MWCNT/nEM composite powder from dispersing under water and help reactive components remain bound to one another in a highly dense manner.

Fifth, the MWCNT/nEM composite material contains multiwalled carbon nanotubes at 1 wt % to 2 wt % such that the combustion rate of the MWCNT/nEM composite powder upon ignition can be improved due to effective thermal energy delivery.

Sixth, when igniting nanoenergetic material pellets in air or under water, a remote laser ignition system can be formed using an automatically actuated mirror and a traceable, small-sized sensor.

BEST MODE

Hereinafter, examples of a nanoenergetic material composite having a remote ignition characteristic by a high-power pulsed laser beam according to the present invention and a method of preparing the nanoenergetic material composite will be described in detail.

The characteristics and benefits of the nanoenergetic material composite having a remote ignition characteristic by a high-power pulsed laser beam according to the present invention and the method of preparing the nanoenergetic material composite will be clarified through a detailed explanation of examples provided below.

Figure 1:
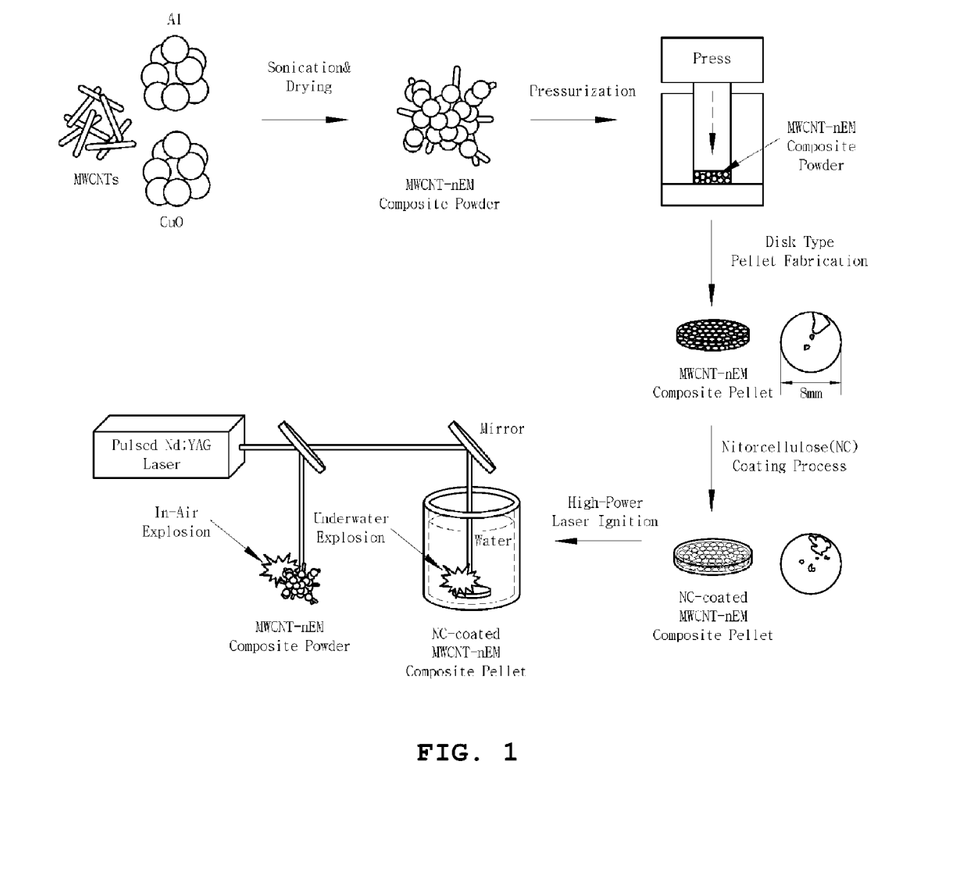
FIG. 1 is a schematic diagram for illustrating a process of preparing a nanoenergetic material composite and performing optical ignition according to the present invention.
Figure 2:
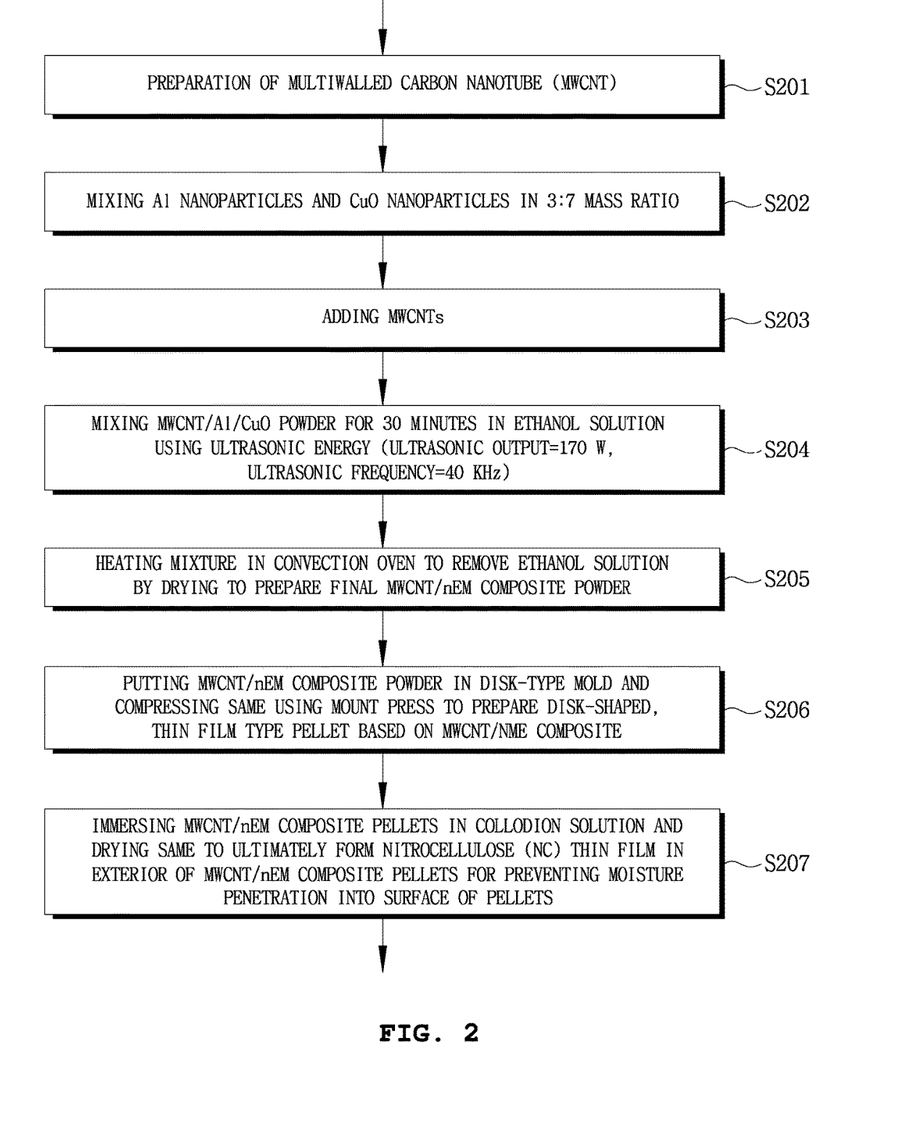
FIG. 2 is a flowchart for describing a process of preparing a nanoenergetic material composite according to the present invention.

FIG. 1 is a schematic diagram for illustrating a process of preparing a nanoenergetic material composite and performing optical ignition according to the present invention, and FIG. 2 is a flowchart for describing a process of preparing a nanoenergetic material composite according to the present invention.

The present invention relates to the development of a new method of igniting a nanoenergetic material, and to a method of igniting a nanoenergetic material by remote optical ignition by a high-power laser beam.

Using laser beam irradiation for igniting a nanoenergetic material offers the following advantages:
  (i) direct contact between the nanoenergetic material and a light source is not necessary;
  (ii) remote ignition from a long distance is possible; and
  (iii) the light source is less sensitive to environmental factors (e.g. temperature, pressure, humidity) of the surroundings.

Therefore, through developing a new method of igniting a nanoenergetic material by high-power laser beam irradiation, the scope of thermal engineering application of nanoenergetic materials can be maximized.

In one exemplary embodiment of a nanoenergetic material composite having a remote ignition characteristic by a high-power pulsed laser beam according to the present invention and a method of preparing such a nanoenergetic material composite, a remote optical ignition method based on a high-power Nd:YAG laser is applied for the remote ignition of the nanoenergetic material and use of the remote ignition for explosion in air or under water.

A nanoenergetic material composite having a remote ignition characteristic by a high-power pulsed laser beam according to the present invention is prepared as follows:

A powder and pellets based on a nanoenergetic material are prepared using aluminum (Al) nanoparticles as a fuel material and copper oxide (CuO) nanoparticles as an oxidizer material, and a nanoenergetic composite material is synthesized by mixing the two materials.

To this nanoenergetic composite material, various contents of multiwalled carbon nanotubes (MWCNTs) are added, and changes in thermal energy delivery characteristics and explosive characteristics within the nanoenergetic material upon remote ignition by a high-power laser beam are monitored, and the content of multiwalled carbon nanotubes to be added is determined accordingly.

In particular, the nanoenergetic material composite having a remote ignition characteristic by a high-power pulsed laser beam according to the present invention is prepared in consideration of a pressurization rate, a combustion rate, an ignition delay time, and a total burn time to improve nanoenergetic material characteristics in terms of laser beam ignition, combustion, and explosion in air or under water upon ignition by the high-power laser beam.

Preferably, the MWCNT/nEM composite powder is prepared as follows.

A MWCNT/Al/CuO powder, which was prepared by mixing the Al nanoparticles and CuO nanoparticles in a 3:7 mass ratio and then adding multiwalled carbon nanotubes in a ratio of 0, 1, 2, 5, and 10 wt % to the mixture respectively, is mixed in an ethanol solution for 30 minutes using ultrasonic energy (ultrasonic output=170 W, ultrasonic frequency=40 kHz). The ethanol solution is removed by drying as the powder is heated at 80° C. for 30 minutes in a convection oven. As a result, a final MWCNT/nEM composite powder is prepared.

In addition, for underwater explosion, thin film type pellets of the MWCNT/nEM composite powder are prepared by applying high pressure on the powder, and the pellets are immersed in a collodion solution and are subsequently dried to form a nitrocellulose (NC) thin film for waterproofing on a surface of the pellets.

The method of preparing such a nanoenergetic material composite having a remote ignition characteristic by a high-power pulsed laser beam according to the present invention includes, as shown in FIG. 2, a process S201 of preparing multiwalled carbon nanotubes, a process S202 of mixing Al nanoparticles and CuO nanoparticles in a 3:7 mass ratio, a process S203 of adding the multiwalled carbon nanotubes, a process S204 of mixing the MWCNT/Al/CuO powder in an ethanol solution for 30 minutes using ultrasonic energy (ultrasonic output=170 W, ultrasonic frequency=40 kHz), a process S205 of heating the powder in a convection oven to remove the ethanol solution by drying to prepare a final MWCNT/nEM composite powder, a process S206 of placing the MWCNT/nEM composite powder in a disk-type mold and compressing the powder using a mount press to prepare disk-shaped, thin film type pellets based on the MWCNT/nEM composite, and a process S207 of immersing the MWCNT/nEM composite pellets in a collodion solution and subsequently drying the pellets to ultimately form an NC thin film on an exterior of the disk-shaped MWCNT/nEM composite pellets for preventing moisture penetration into a surface of the pellets.

Specifically, the method of preparing the nanoenergetic material composite having a remote ignition characteristic by a high-power pulsed laser beam according to the present invention is described as follows:

As the fuel metal, Al nanoparticles (NTbase Co. Ltd., Korea) having an average diameter of approximately 80 nm and CuO nanoparticles (NTbase Co. Ltd., Korea) having an average diameter of approximately 100 nm were used as the fuel metal and the metal oxide, respectively.

As shown in FIG. 1, a MWCNT/nEM (where nEM=Al nanoparticles+CuO nanoparticles) composite powder and MWCNT/nEM composite pellets are prepared.

In this case, the multiwalled carbon nanotubes having an average diameter of approximately 20 nm are thermal energy delivery media for controlling the macroscopic explosiveness within the nanoenergetic material upon the laser beam ignition of the nanoenergetic material.

Also, in the case of the MWCNT/nEM composite powder, the Al nanoparticles and CuO nanoparticles are mixed in a 3:7 mass ratio, and multiwalled carbon nanotubes are added to the mixture in a ratio of 0, 1, 2, 5, and 10 wt %, respectively.

In this case, it is clear that the ratios at which the multiwalled carbon nanotubes are added are not limited to the examples provided above but can be varied for the preparation process.

Subsequently, the MWCNT/Al/CuO powder is mixed in an ethanol solution for 30 minutes using ultrasonic energy (ultrasonic output=170 W, ultrasonic frequency=40 kHz).

Then, the material thus prepared is put in a convection oven and is heated at 80° C. for 30 minutes to remove the ethanol solution by drying the same. As a result, a final MWCNT/nEM composite powder is prepared.

In order to analyze explosion characteristics of the nanoenergetic material composite in air according to various multiwalled carbon nanotube contents, it is preferable that the remote ignition by a high-power Nd:YAG laser beam is tested as follows:

A Q-switched Nd:YAG laser (Continuum, Model No. Surelite II-10), which is the pulsed laser to be used, is operated under the following conditions:

Specifically, the pulse width is 5-7 ns, the wavelength is 532 nm, the power is 3 W (Q switch delay setting @ 180 μs), and the beam diameter is 7 mm.

A MWCNT/nEM composite powder is placed into a circle (with a 8 mm diameter) on a glass plate, and the glass plate on which the MWCNT/nEM composite powder is placed is remotely irradiated with a high-power pulsed Nd:YAG laser beam.

In this case, the ignition and explosion of the entire MWCNT/nEM composite powder in air at normal pressure are photographed with a high speed camera (Photron Inc., FASTCAM SA3 120K) at a frame rate of 30 kHz.

The maximum frame rate of the high speed camera is 1200000 fps, wherein the minimum frame rate is 60 fps, the sensor size is 17.4 mm×17.4 mm (CMOS image sensor), the pixel size is 17 μm×17 μm, and the operating voltage and current conditions are DC 22-32V 100 VA, AC 100-240 V 10-60 Hz, and 60 VA, respectively.

Completely unlike the ignition and explosion characteristics of a nanoenergetic material powder in the air, the stable ignition and subsequent explosion of nanoenergetic materials are very difficult to be induced for a nanoenergetic material powder under water, because the water molecules surrounding the fuel material and oxidizer material disturb oxygen supply and rapid cooling occurs when external energy is supplied for ignition.

Therefore, for an application of the nanoenergetic material composite in underwater ignition and explosion, it is very important that the MWCNT/nEM composite powder, which is a reactive material, does not disperse in water and the reactive components remain bound to one another in a highly dense manner.

For this, the present invention prepares composite pellets and a thin film as follows:

A method of preparing MWCNT/nEM composite pellets is provided below.

In one example, 26 mg of a MWCNT/nEM composite powder is placed in a disk-type mold and compressed with a 5 MPa pressure using a mount press for 10 minutes to prepare disk-shaped, thin film type pellets based on the MWCNT/nEM composite and having dimensions of 8 mm diameter×0.4 mm height.

To prevent moisture penetration into a surface of the MWCNT/nEM composite pellets thus prepared, the pellets are immersed in a collodion solution and then dried to ultimately form a nitrocellulose (NC) thin film on an exterior of the disk-shaped MWCNT/nEM composite pellets.

The NC-coated MWCNT/nEM composite pellets are fixed to a bottom of a tank filled with water, and an upper surface of the MWCNT/nEM composite pellets is irradiated with a high-power Nd:YAG laser beam from a top of the water to test ignition and explosion characteristics under water in the following manner:

As shown in FIG. 1, the underwater ignition and explosion of MWCNT/nEM composite pellets coated with an NC thin film by laser beam irradiation are measured in real time at various frame rates using a high speed camera (Photron Inc., FASTCAM SA3 120K).

FIG. 1 is a schematic diagram for illustrating a process of preparing multiwalled carbon nanotubes, a nanoenergetic material (Al+CuO) composite powder, and pellets, and monitoring the optical ignition and explosion phenomena thereof in air or under water by high-power pulsed Nd:YAG laser beam irradiation.

A physical structure, degree of mixing, chemical composition, etc. of the nanoenergetic material composite having a remote ignition characteristic by a high-power pulsed laser beam according to the present invention and the MWCNT/nEM composite prepared according to the preparation method are investigated by SEM/TEM analyses as follows:

Based on the SEM/TEM analyses, a strong attachment between surfaces of the Al fuel material nanoparticles and CuO metal oxidizer nanoparticles can be verified.

In addition, it can also be found that the multiwalled carbon nanotubes are relatively uniformly dispersed in nanoscale in the composite of the Al nanoparticles and CuO nanoparticles.

Likewise, TEM images and Scanning TEM results showing chemical compositions also verify that the Al nanoparticles, CuO nanoparticles, and multiwalled carbon nanotubes are uniformly dispersed to a large degree in nanoscale.

Figure 3:
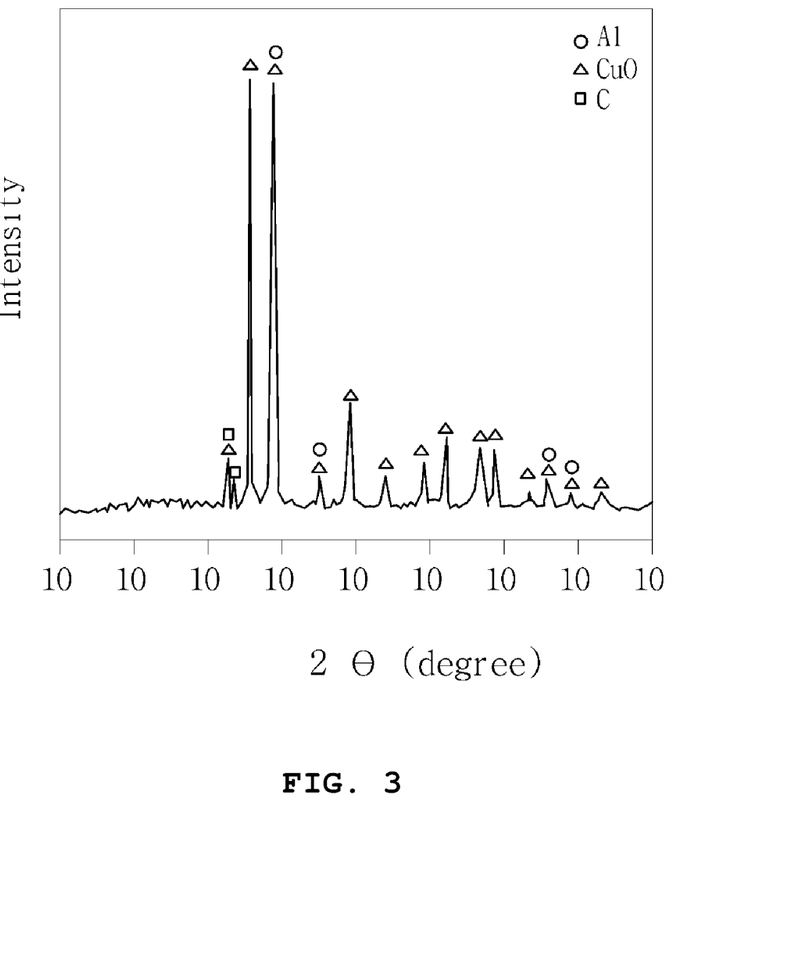
FIG. 3 is a graph providing XRD analytical results for a MWCNT/nEM composite powder according to the present invention.

Also, based on XRD measurement results provided in FIG. 3, it can be additionally seen that the fuel metal nanoparticles and metal oxidizer nanoparticles generate strong signals due to X-ray incidence, indicating Al and CuO crystals.

Remote ignition and explosion characteristics in air of the MWCNT/nEM composite powder prepared according to the present invention may be investigated initially by using a high-power pulsed Nd:YAG laser beam as follows:

The ignition and explosion of the MWCNT/nEM composite powder in air are monitored in real time using a high speed camera, and the ignition delay time, combustion rate, total burn time, etc. are ultimately determined by analyzing a video and still images of the explosion.

Figure 4:
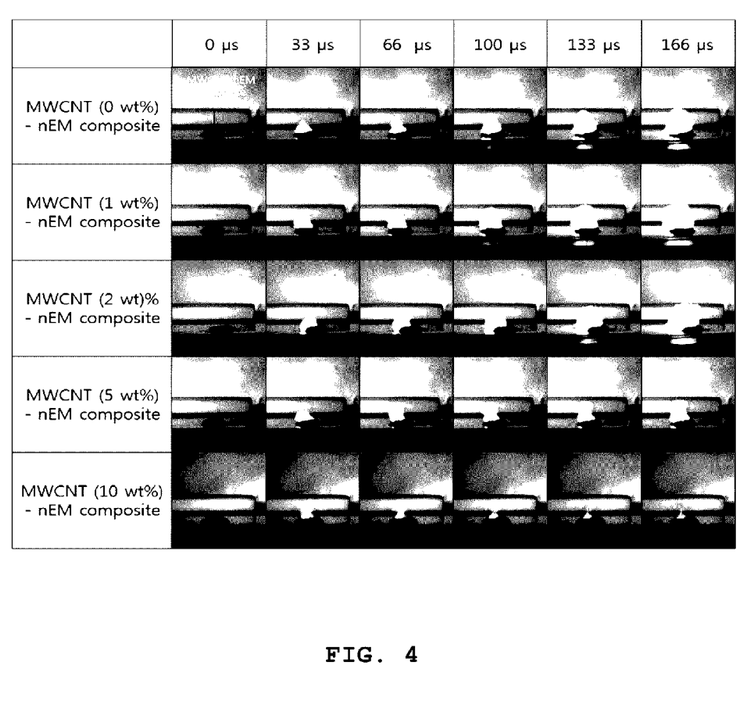
FIG. 4 is a set of high-speed-camera images of a MWCNT (0, 1, 2, 5, 10 wt %)/nEM composite powder ignited by high-power pulsed Nd:YAG laser beam irradiation.
Figure 5:
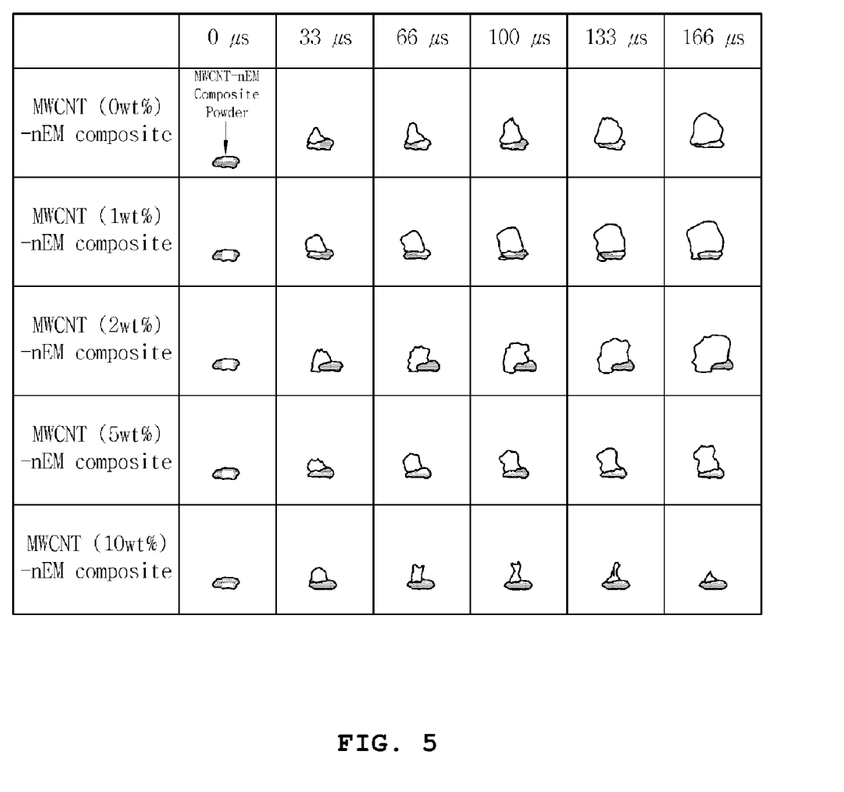
FIG. 5 is a set of simplified high-speed-camera images of a MWCNT (0, 1, 2, 5, 10 wt %)/nEM composite powder ignited by high-power pulsed Nd:YAG laser beam irradiation.

Images showing the remote ignition by a high-power pulsed Nd:YAG laser beam and a flame spreading in air after the explosion of MWCNT (0, 1, 2, 5, 10 wt %)/nEM composite powders with various mixing ratios are provided in FIGS. 4 and 5.

The combustion rate of a nanoenergetic material is calculated based on snapshot analysis.

In this case, the combustion rate of a nanoenergetic material is calculated by dividing a total length of the nanoenergetic material specimen by a total time in which a flame that started moving at an end of the specimen reaches the other end.

As shown in FIGS. 4 and 5, it can be seen that the ignition and explosion of the nanoenergetic material powder are successfully induced in air by high-power Nd:YAG laser beam irradiation.

That is, when the nanoenergetic material powder is exposed to a high-power Nd:YAG laser beam, peripheral ignition occurs at an area of exposure and a concurrently generated high-temperature flame in the periphery subsequently spreads to adjacent nanoenergetic materials, ultimately resulting in macroscopic combustion and explosion.

TABLE 1

| MWCNT content (wt %) | Ignition delay time (ms) | | Total burn time (ms) | | Burn rate (m/s) | |
|---|---|---|---|---|---|---|
| | In-Air | Underwater | In-Air | Underwater | In-Air | Underwater |
| 0 | ~0.0 | ~0.3 | ~15 | ~12 | ~54 | ~30 |
| 1 | ~0.0 | ~0.4 | ~13 | ~11 | ~60 | ~34 |
| 2 | ~0.0 | ~0.6 | ~16 | ~13 | ~48 | ~28 |
| 5 | ~0.0 | ~1.3 | ~21 | ~14 | ~27 | ~14 |
| 10 | ~0.0 | ~3.0 | ~48 | ~70 | ~4 | ~3 |

Table 1 shows the ignition delay time, total burn time, and combustion rate (burn rate) measured upon the ignition in air of a MWCNT/nEM composite powder (i.e., MWCNT/Al nanoparticle/CuO nanoparticle) by high-power pulsed Nd:YAG laser beam irradiation, underwater ignition of MWCNT/nEM composite pellets coated with an NC thin film, and combustion and explosion following the ignition.

As shown in Table 1, the ignition delay time of a MWCNT/nEM composite powder subjected to laser beam irradiation is close to 0 s in most cases, regardless of the multiwalled carbon nanotube content, which indicates that the nanoenergetic material ignites in air by laser beam irradiation almost immediately without a delay.

The macroscopic explosiveness of a nanoenergetic material composite after laser beam ignition may vary according to a heat transfer characteristic among multiwalled carbon nanotubes, fuel (Al) particles, and oxidizer (CuO) particles. The calculated value of a burn rate in air for each MWCNT (1, 2, 5, 10 wt %)/nEM composite powder is about 60 m/s for MWCNT=1 wt %, 48 m/s for MWCNT=2 wt %, 27 m/s for MWCNT=5 wt %, and 4 m/s for MWCNT=10 wt %, respectively, as summarized in Table 1.

The above results indicate that adding over a certain amount of multiwalled carbon nanotubes to a nanoenergetic material can somewhat reduce the explosion following the ignition of a MWCNT/nEM composite powder.

In other words, when the multiwalled carbon nanotube content in a nanoenergetic material matrix is less than 1 wt %, the burn rate of a MWCNT/nEM composite powder can be increased through effective thermal energy delivery upon ignition, but when the multiwalled carbon nanotube content exceeds about 2 wt %, the burn rate of a MWCNT/nEM composite powder significantly decreases. Based on this result, it seems that multiwalled carbon nanotubes exceeding a certain amount cannot be uniformly dispersed but are somewhat agglomerated, thus failing to uniformly dissipate the heat within the nanoenergetic material ignited by a laser beam, hindering thermal energy delivery and rather releasing the thermal energy to the ambient air, and ultimately preventing the temperature from increasing enough to cause the subsequent combustion and explosion of the nanoenergetic material. Such a behavior is thought to ultimately cause a significant reduction in the macroscopic burn rate.

As more multiwalled carbon nanotubes are added to a nanoenergetic material, the burn rate decreases, and the combustion of the nanoenergetic material slows down. Ultimately, the macroscopic total burn time increases.

Therefore, in an exemplary embodiment of the present invention, the multiwalled carbon nanotube content in a nanoenergetic material is 1 wt % to 2 wt %.

Also, unlike when igniting a MWCNT/nEM composite powder in air using a high-power pulsed Nd:YAG laser beam, for inducing the ignition and explosion of the MWCNT/nEM composite under water, high pressure is applied on a certain amount of the MWCNT/nEM composite powder to prepare thin film type pellets, which are immersed in a collodion solution and then dried to form an NC thin film for waterproofing on a surface of the pellets.

The MWCNT/nEM composite pellets thus coated with an NC thin film are fixed to a bottom of a tank filled with water (for the experiment, the water level is always maintained at about 5 cm), and a surface of the MWCNT/nEM composite pellets is ignited by emitting a high-power pulsed Nd:YAG laser beam perpendicularly to the water surface by using mirrors as illustrated in FIG. 1.

In this case, the ignition and subsequent explosion of the MWCNT/nEM composite pellets using the high-power pulsed laser beam are measured and recorded in the same manner by using a high speed camera (Photron Inc., FAST-CAM SA3 120K).

Figure 6:
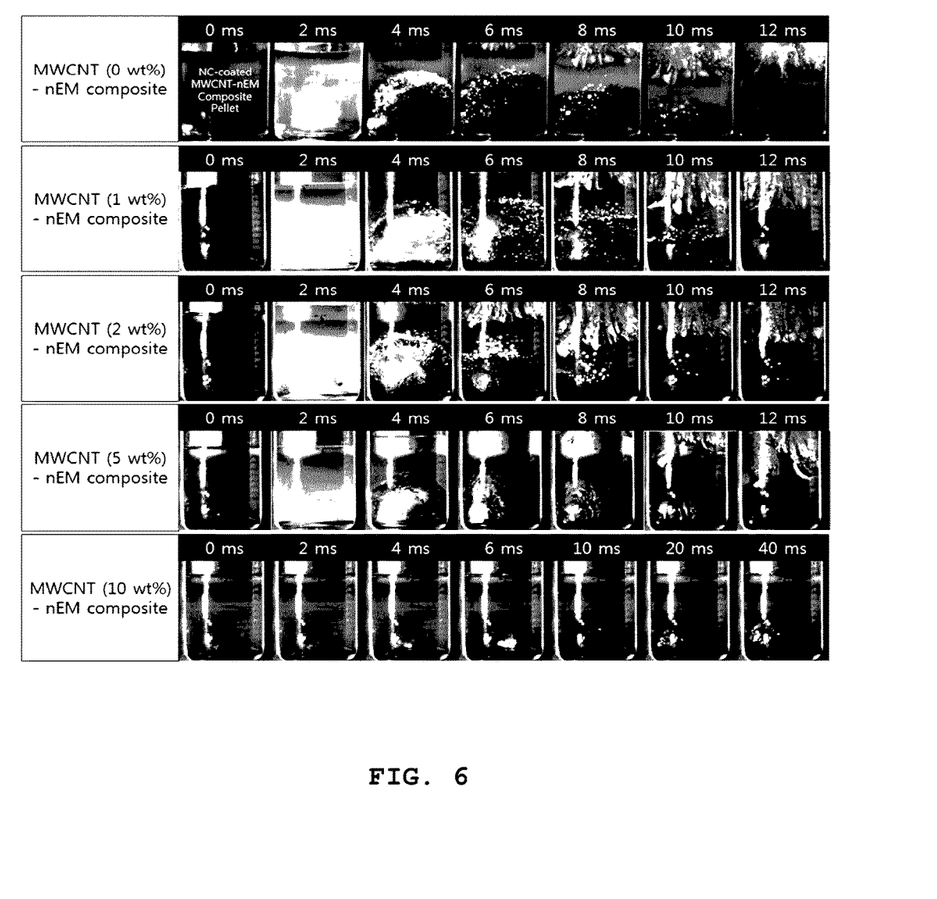
FIG. 6 is a set of high-speed-camera images of MWCNT/nEM composite pellets coated with an NC thin film, ignited under water by high-power pulsed Nd:YAG laser beam irradiation, and showing an explosive reaction.
Figure 7:
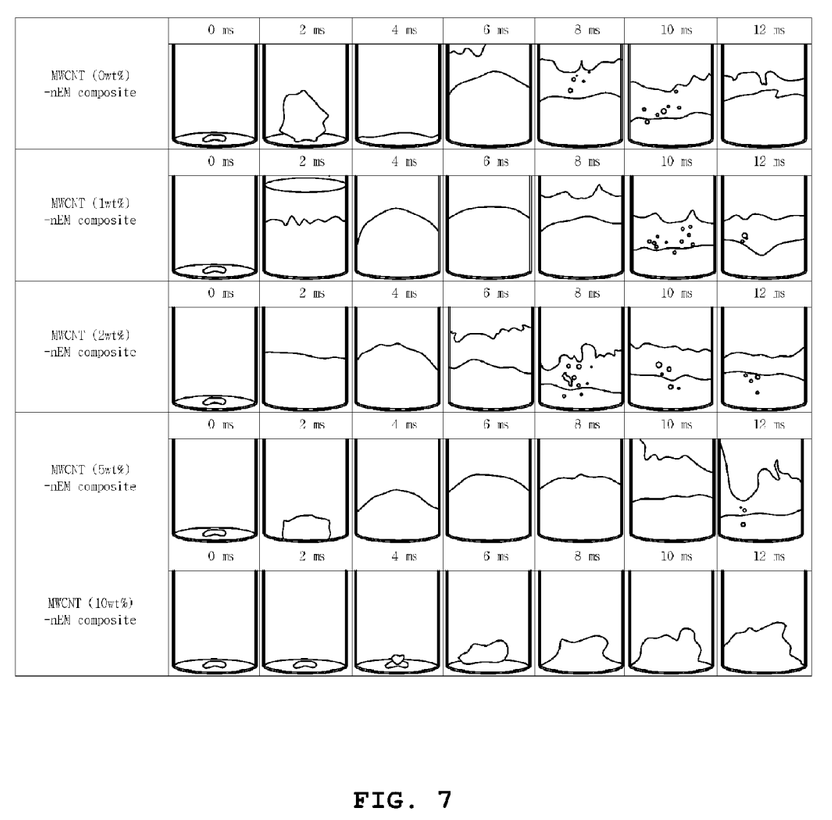
FIG. 7 is a set of simplified high-speed-camera images of MWCNT/nEM composite pellets coated with an NC thin film, ignited under water by high-power pulsed Nd:YAG laser beam irradiation, and showing an explosive reaction.

FIGS. 6 and 7 are respectively high-speed-camera snapshots and simplified snapshots of MWCNT/nEM composite pellets coated with an NC thin film (i.e., NC thin film/MWCNTs/Al nanoparticles/CuO nanoparticles), ignited under water by high-power pulsed Nd:YAG laser beam irradiation, and showing an explosive reaction.

When the laser beam is emitted, targeting a point under water, a loud noise due to an instantaneous explosion was generated at the same time as ignition and a very strong shock wave, which makes most of the water in the tank to momentarily spurt, is generated for both the nanoenergetic material pellets coated with an NC thin film (i.e., NC thin film/Al nanoparticles/CuO nanoparticles) and the MWCNT/nEM composite pellets coated with an NC thin film (i.e., NC thin film/MWCNTs/Al nanoparticles/CuO nanoparticles), as shown in FIGS. 6 and 7.

However, in the case of MWCNT/nEM composite pellets without an NC thin film (i.e., MWCNTs/Al nanoparticles/CuO nanoparticles), underwater ignition and explosive combustion by laser beam irradiation never occur.

This is because water deeply penetrates into the MWCNT/nEM composite pellets without an NC thin film, causing rapid cooling by taking away even the least amount of heat necessary for the ignition and explosive combustion of MWCNT/nEM, thus hindering ignition and subsequent explosion of the MWCNT/nEM composite.

Also when an NC thin film coating is applied but the pellets are made only of compressed, pure, fuel metal Al nanoparticles without containing any CuO nanoparticles (i.e., NC thin film/Al nanoparticles), ignition and explosive combustion by laser beam irradiation never occur.

When a pure Al nanopowder is ignited in air by a laser beam, oxygen supply from the surrounding air is caused by diffusion, and thus the pure Al nanoparticle powder is combusted relatively slowly after ignition. In contrast, when Al nanoparticles are ignited under water by a laser beam, the oxygen necessary for subsequent combustion can be supplied only from a metal oxidizer such as CuO nanoparticles. Since the pellets based on pure Al nanoparticles and coated with an NC thin film do not contain any source of oxygen required for combustion, ignition and explosive combustion do not occur.

Therefore, it can be confirmed that a fuel material (fuel metal), a metal oxidizer (metal oxide), a waterproof membrane (polymer) on a surface of pellets for preventing moisture penetration, and the like are essential when the underwater ignition and explosive combustion of nanoenergetic material composite pellets by high-power laser beam irradiation are intended.

For this reason, the present invention applies Al nanoparticles as a fuel material, CuO nanoparticles as an oxidizer, and an NC thin film as a waterproof membrane constituent, thus enabling control of the high-power laser beam ignition and explosiveness of nanoenergetic material composite pellets under water.

Unlike the data of ignition characteristics in air provided in Table 1, the data of ignition delay time under water shows that a higher multiwalled carbon nanotube content in a nanoenergetic material leads to a very long ignition delay time upon laser beam irradiation.

When multiwalled carbon nanotubes are added to a nanoenergetic material in a ratio of about 10 wt %, the ignition delay time is about 3.0 ms, which is about 10 times longer than the ignition delay time (0.3 ms) of a nanoenergetic material without any added multiwalled carbon nanotubes. This seems to be a result of multiwalled carbon nanotubes rapidly dissipating the heat that was generated due to the absorption of the laser beam emitted to a surface of the nanoenergetic material to the surroundings.

However, once MWCNT/nEM composite pellets are ignited by a laser beam, the burn rate somewhat increases to about 34 m/s when the multiwalled carbon nanotube content is at minimum (1 wt %) and rapidly decreases to about 14 m/s or less when the multiwalled carbon nanotube content is 5 wt % or more.

Although multiwalled carbon nanotubes at a certain level uniformly deliver thermal energy as thermal energy delivery media within a nanoenergetic material, when more multiwalled carbon nanotubes are added to the nanoenergetic material, severe agglomeration, which is considered as a factor inhibiting uniform heat delivery by disrupting heat delivery or dissipating heat to the surroundings, is formed.

As a result, the total burn time under water upon the laser beam ignition of MWCNT/nEM composite pellets provided in Table 1 increases with an increase in the multiwalled carbon nanotube content in a nanoenergetic material, which seems to be a result of the multiwalled carbon nanotubes slowing down thermal energy delivery within the nanoenergetic material.

In addition, the ignition potential of a nanoenergetic material changes according to controlled laser beam power as follows:

In remotely igniting a nanoenergetic material using a high-power Nd:YAG laser beam, the laser beam power level is one of very important variables.

The maximum power of the Nd:YAG laser used in the present invention is 2 W (Q switch delay setting @ 180 μs), and when different laser beam power levels are tried, a phenomenon in which a nanoenergetic material is ignited at a power level equal to or greater than a certain power level can be observed.

For example, at 5 cm below the water surface, ignition and explosion are observed with a minimum power of 0.260 W (Q switch setting @ 120 μs).

Also, the laser beam power is measured at various depths in water (0 to 11 cm) by using a power meter and fixing the Q switch setting to 120 μs. According to the results provided in Table 2, at a greater depth of about 10 cm below the water surface, the power level decreases from the initial value of 0.275 W to 0.252 W, which is lower than the initial value by about 8%.

Therefore, considering a reduction in the laser beam energy due to light scattering, etc. under water, use of a laser beam light source with sufficient power is necessary.

TABLE 2

| Depth in water (cm) | Power (mW) |
| --- | --- |
| 0 | 275 |
| 1 | 270 |
| 2 | 267.5 |
| 3 | 265 |
| 4 | 262.5 |
| 5 | 260 |
| 6 | 257.5 |
| 7 | 255 |
| 8 | 257.5 |
| 9 | 252.5 |
| 10 | 252.5 |
| 11 | 250 |

Also, the ignition potential of nanoenergetic material pellets upon underwater ignition changes according to a depth in water.

In an exemplary embodiment of the present invention, the maximum depth in water is 5 cm. However, the laser beam intensity is expected to gradually decrease with depth in water such that results as in Table 2 may be obtained.

Therefore, a laser beam generator present outside water requires a laser power source that generates sufficient power. Since the intensity of the laser beam is reduced due to an energy loss by the absorption and scattering of the laser beam as the laser beam passes through water, which is an intermediate medium, and finally reaches the nanoenergetic material pellets placed under water, such a reduction in the intensity should be considered beforehand.

Also, considerations for constructing a remote laser ignition system using automatically actuated mirrors and a traceable, small-sized sensor upon the ignition of nanoenergetic material pellets in air or under water are as follows:

When a system operated by mirrors whose angles can be automatically controlled is applied, an angle of incidence of a laser beam striking the nanoenergetic material can be controlled by locating the nanoenergetic material powder or pellets placed in a particular location in the air or under water and then variously controlling the mirrors installed in a path of the laser beam.

Based on this technique, a laser ignition device system for remote ignition of a nanoenergetic material powder or pellets may be constructed.

Especially by attaching a traceable, small-sized sensor in a nanoenergetic material powder or pellets and having a sensor system capable of locating the powder or pellets automatically, a remote laser ignition system capable of igniting a nanoenergetic material by accurately targeting the material with a laser beam can be constructed.

The nanoenergetic material composite having a remote ignition characteristic by a high-power pulsed laser beam according to the present invention and the method of preparing such a nanoenergetic material composite introduce various contents of multiwalled carbon nanotubes to a nanoenergetic complex material to enable remote ignition by the high-power laser beam, and use an NC thin film formed on an exterior of disk-shaped MWCNT/nEM composite pellets to prevent the MWCNT/nEM composite powder from dispersing under water and help reactive components remain bound to one another in a highly dense manner.

It may be understood that the present invention has been implemented in a modified form that is not deflected from the essential characteristics of the present invention as described above.

Therefore, the stated examples should be considered in a descriptive sense only and not for purposes of limitation, and it should be understood that the scope of the present invention is defined not by the detailed description but by the appended claims. All modifications and equivalents that fall within the scope of the appended claims will be construed as being included in the present invention.

INDUSTRIAL APPLICABILITY

The nanoenergetic material composite having a remote ignition characteristic by a high-power pulsed laser beam according to the present invention and the method of preparing the same use a nitrocellulose (NC) thin film formed on an exterior of disk-shaped MWCNT/nEM composite pellets to prevent the MWCNT/nEM composite powder from dispersing under water and help reactive components remain bound to one another in a highly dense manner, thereby enabling remote ignition by the high-power laser beam.

What is claimed is:

1. A nanoenergetic material composite having a remote ignition characteristic by a high-power pulsed laser beam, the nanoenergetic material composite being in a form of a multiwalled carbon nanotube/nanoenergetic material (MWCNT/nEM) composite powder that is prepared by adding multiwalled carbon nanotubes to a nanoenergetic material, which is a mixture of fuel material nanoparticles and metal oxidizer nanoparticles, wherein the multiwalled carbon nanotubes enhance a combustion rate of the multiwalled carbon nanotube/nanoenergetic material (MWCNT/nEM) composite powder by delivering thermal energy upon remote optical ignition by the high-power pulsed laser beam.

2. A nanoenergetic material composite having a remote ignition characteristic by a high-power pulsed laser beam, the nanoenergetic material composite being in a form of thin film type pellets that are prepared by compressing a multiwalled carbon nanotube/nanoenergetic material (MWCNT/nEM) composite powder and have a nitrocellulose (NC) thin film for waterproofing formed on a surface thereof, wherein the multiwalled carbon nanotube/nanoenergetic material (MWCNT/nEM) composite powder is prepared by adding multiwalled carbon nanotubes to a nanoenergetic material, which is a mixture of fuel material nanoparticles and metal oxidizer nanoparticles, and the multiwalled carbon nanotubes enhance a combustion rate of the multiwalled carbon nanotube/nanoenergetic material (MWCNT/nEM) composite powder by delivering thermal energy upon remote optical ignition by the high-power pulsed laser beam.

3. The nanoenergetic material composite having a remote ignition characteristic by a high-power pulsed laser beam according to claim 1, wherein the multiwalled carbon nanotube/nanoenergetic material (MWCNT/nEM) composite contains the multiwalled carbon nanotubes at 1 wt % to 2 wt %.

4. The nanoenergetic material composite having a remote ignition characteristic by a high-power pulsed laser beam according to claim 1, wherein aluminum (Al) nanoparticles are used as the fuel material nanoparticles and copper oxide (CuO) nanoparticles are used as the oxidizer material nanoparticles, and the fuel material nanoparticles and the oxidizer material nanoparticles are mixed together to form the nanoenergetic composite material.

5. The nanoenergetic material composite having a remote ignition characteristic by a high-power pulsed laser beam according to claim 1, wherein a ratio at which the fuel material nanoparticles and the metal oxidizer nanoparticles are mixed and a percentage of the multiwalled carbon nanotubes to be added are determined based on pressurization rate, combustion rate, ignition delay time, and total burn time.

6. The nanoenergetic material composite having a remote ignition characteristic by a high-power pulsed laser beam according to claim 1, wherein the multiwalled carbon nanotube/nanoenergetic material (MWCNT/nEM) composite is ignited, combusted, and explodes in air or under water when a pulsed Nd:YAG laser beam is remotely emitted, as the multiwalled carbon nanotubes act as thermal energy delivery media within the nanoenergetic material.

7. The nanoenergetic material composite having a remote ignition characteristic by a high-power pulsed laser beam according to claim 1, wherein the multiwalled carbon nanotube/nanoenergetic material (MWCNT/nEM) composite includes a traceable, small-sized sensor therein so that a point at which the multiwalled carbon nanotube/nanoenergetic material (MWCNT/nEM) composite is detected can be irradiated with the high-power pulsed laser beam.

8. The nanoenergetic material composite having a remote ignition characteristic by a high-power pulsed laser beam according to claim 7, wherein, after locating the multiwalled carbon nanotube/nanoenergetic material (MWCNT/nEM) composite, an angle of incidence of the high-power pulsed laser beam remotely emitted is controlled through controlling angles of mirrors installed in a path of the high-power pulsed laser beam so that the high-power pulsed laser beam strikes the multiwalled carbon nanotube/nanoenergetic material (MWCNT/nEM) composite.

9. The nanoenergetic material composite having a remote ignition characteristic by a high-power pulsed laser beam according to claim 2, wherein aluminum (Al) nanoparticles are used as the fuel material nanoparticles and copper oxide (CuO) nanoparticles are used as the oxidizer material nanoparticles, and the fuel material nanoparticles and the oxidizer material nanoparticles are mixed together to form the nanoenergetic composite material.

10. The nanoenergetic material composite having a remote ignition characteristic by a high-power pulsed laser beam according to claim 2, wherein a ratio at which the fuel material nanoparticles and the metal oxidizer nanoparticles are mixed and a percentage of the multiwalled carbon nanotubes to be added are determined based on pressurization rate, combustion rate, ignition delay time, and total burn time.

11. The nanoenergetic material composite having a remote ignition characteristic by a high-power pulsed laser beam according to claim 2, wherein the multiwalled carbon nanotube/nanoenergetic material (MWCNT/nEM) composite is ignited, combusted, and explodes in air or under water when a pulsed Nd:YAG laser beam is remotely emitted, as the multiwalled carbon nanotubes act as thermal energy delivery media within the nanoenergetic material.

12. The nanoenergetic material composite having a remote ignition characteristic by a high-power pulsed laser beam according to claim 2, wherein the multiwalled carbon nanotube/nanoenergetic material (MWCNT/nEM) composite includes a traceable, small-sized sensor therein so that a point at which the multiwalled carbon nanotube/nanoenergetic material (MWCNT/nEM) composite is detected can be irradiated with the high-power pulsed laser beam.

13. The nanoenergetic material composite having a remote ignition characteristic by a high-power pulsed laser beam according to claim 12, wherein, after locating the multiwalled carbon nanotube/nanoenergetic material (MWCNT/nEM) composite, an angle of incidence of the high-power pulsed laser beam remotely emitted is controlled through controlling angles of mirrors installed in a path of the high-power pulsed laser beam so that the high-power pulsed laser beam strikes the multiwalled carbon nanotube/nanoenergetic material (MWCNT/nEM) composite.

* * * * *